United States Patent
Lee et al.

(10) Patent No.: US 10,595,351 B2
(45) Date of Patent: Mar. 17, 2020

(54) TECHNIQUE FOR SUPPORTING INITIAL SETUP BETWEEN CONNECTION REQUEST DEVICE AND CONNECTION ACCEPTANCE DEVICE

(71) Applicant: Samsung Electronics Co., Ltd., Gyeonggi-do (KR)

(72) Inventors: Soo-Yong Lee, Gyeonggi-do (KR); Byung-Moo Lee, Seoul (KR); Joo-Yeol Lee, Gyeonggi-do (KR); Dong He, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 88 days.

(21) Appl. No.: 15/559,704

(22) PCT Filed: Mar. 21, 2016

(86) PCT No.: PCT/KR2016/002810
§ 371 (c)(1),
(2) Date: Sep. 19, 2017

(87) PCT Pub. No.: WO2016/148548
PCT Pub. Date: Sep. 22, 2016

(65) Prior Publication Data
US 2018/0054845 A1    Feb. 22, 2018

(30) Foreign Application Priority Data
Mar. 19, 2015  (KR) .......................... 10-2015-0038494

(51) Int. Cl.
*H04W 72/04* (2009.01)
*H04W 76/14* (2018.01)
(Continued)

(52) U.S. Cl.
CPC ....... *H04W 76/14* (2018.02); *H04W 72/0406* (2013.01); *H04W 4/70* (2018.02); *H04W 48/16* (2013.01)

(58) Field of Classification Search
CPC . H04W 76/10–19; H04W 84/12; H04W 4/70; H04W 48/14; H04W 48/08; H04W 48/16
See application file for complete search history.

(56) References Cited

U.S. PATENT DOCUMENTS 8,917,651 B2   12/2014  Dattagupta
2006/0142034 A1*  6/2006  Wentink ................ H04W 8/005
                                                                                    455/515
(Continued)

FOREIGN PATENT DOCUMENTS

JP        2012034026        2/2012
WO    WO 2014181995    11/2014

OTHER PUBLICATIONS

K. Hori, T. Ogishi, M. Lai, D. Chee and K. Sinkar, "Automatic over-the-air provisioning for Wi-Fi equipped M2M devices," 38th Annual IEEE Conference on Local Computer Networks, Sydney, NSW, 2013, pp. 675-678. http://ieeexplore.ieee.org/stamp/stamp.jsp?tp=&arnumber=6761308&isnumber=6761208.*

*Primary Examiner* — Maharishi V Khirodhar
*Assistant Examiner* — Kenneth P Hunt
(74) *Attorney, Agent, or Firm* — The Farrell Law Firm, P.C.

(57) ABSTRACT

The present disclosure provides a method for performing initial setup with a connection acceptance device by a connection request device, the method comprising the operations of: performing an association procedure with a configurator; transmitting a first probe request message to the configurator; receiving a first probe response message including information required for a connection to the connection acceptance device from the configurator; driving (Continued)

a timer and transmitting a second probe request message to the connection acceptance device; receiving a second probe response message from the connection acceptance device; and starting a secure connection to the connection acceptance device when the second probe request message is received before the timer has expired, and information included in the second probe response message coincides with the information required for the connection, which is included in the first probe response message.

10 Claims, 10 Drawing Sheets

(51) Int. Cl.
*H04W 4/70* (2018.01)
*H04W 48/16* (2009.01)

(56) References Cited

U.S. PATENT DOCUMENTS

| | | |
|---|---|---|
| 2013/0283346 A1 | 10/2013 | Sun et al. |
| 2014/0064128 A1 | 3/2014 | Park et al. |
| 2014/0211777 A1* | 7/2014 | McRae ................ H04W 48/16 370/338 |
| 2015/0052357 A1 | 2/2015 | Bahr et al. |
| 2015/0131608 A1* | 5/2015 | Son ...................... H04W 76/10 370/330 |
| 2016/0007275 A1 | 1/2016 | Park et al. |

\* cited by examiner

TECHNIQUE FOR SUPPORTING INITIAL SETUP BETWEEN CONNECTION REQUEST DEVICE AND CONNECTION ACCEPTANCE DEVICE

PRIORITY

This application is a National Phase Entry of International Application No. PCT/KR2016/002810, which was filed on Mar. 21, 2016, and claims priority to Korean Patent Application No. 10-2015-0038494 filed on Mar. 19, 2015, the content of each of which is incorporated herein by reference.

TECHNICAL FIELD

The present invention relates to a technique for supporting the initial setup of an Internet of Things (IoT) device, and more particularly, to an initial setup support technique using an apparatus supporting setup between an Access Point (AP) and a device.

BACKGROUND ART

The conventional Internet is a human-centric network in which humans generate and use information, while the current or future Internet, represented by the Internet of Things (IoT), will be an Internet where distributed components, such as an Access Point (AP), an object, and different types of devices, exchange and process information. Also, the Internet of Everything (IoE) concept has been introduced, in which IoT is combined with big-data processing techniques through connection with a cloud server and the like. Therefore, technologies for sensor networks, Machine-To-Machine (M2M) communication, and Machine-Type Communication (MTC) have been studied for connection between objects. As technological elements for implementing IoT, "sensing technology," "wired/wireless communication and network infrastructure," "service interface technology," and "security technology" are emerging.

In an IoT environment, an intelligent Internet Technology (IT) service may be provided that collects and analyzes data generated from connected objects to create new value in human life. The IoT will be applied to the fields of a smart home, a smart building, a smart city, a smart car or connected car, a smart grid, health care, a smart home appliance, advanced medical care services, and the like through convergence and integration of existing IT technology with various industries.

As one of various procedures for supporting IoT, an initial setup procedure between an AP and a device is required. The most direct way for the AP and the device to implement initial setup is a method in which one of the AP and the device recognizes and confirms a setup request triggered by the other. Here, the AP and the device each are necessarily required to perform an operation for recognizing a user, that is, a button-pushing setup method (also known as a push-button configuration (PBC) method).

However, this PBC method requires an input means such as a button, and thus cannot be implemented in a device that does not provide a User Interface (UI). That is, the PBC method is inconvenient due to low usability and cannot be implemented in a device lacking a UI (UI-less device).

A User Experience (UX) for setup that can be commonly applied to IoT devices has also been proposed, and it is required to improve usability thereof.

DETAILED DESCRIPTION OF THE INVENTION

Technical Problem

Therefore, a simple and straightforward setup method is required for an Internet of Things (IoT) device.

The present disclosure provides a User Experience (UX) for setup that can be commonly applied to IoT devices regardless of the communication mode (for example, a Wi-Fi mode or Bluetooth Low Energy (BLE) mode) used for setup, thereby increasing the usability of an IoT device.

The present disclosure provides a new setup procedure that is capable of reducing the load of signaling for security during a setup process.

The present disclosure provides a simple setup procedure that is also capable of being implemented in devices not providing a User Interface (that is, UI-less devices), such as a button.

Technical Solution

The present disclosure proposes a method for performing initial setup with an enroller device by an enrollee device, the method including: performing an association procedure with a configurator; transmitting a first probe request message to the configurator; receiving a first probe response message including information necessary for connection to the enroller device from the configurator; operating a timer and transmitting a second probe request message to the enroller device; receiving a second probe response message from the enroller device; and starting secure connection to the enroller device when the second probe request message is received before the timer expires, and information included in the second probe response message matches the information necessary for the connection, which is included in the first probe response message.

The present disclosure proposes an enrollee device that performs initial setup with an enroller device, the device including: a controller that conducts control to perform an association procedure with a configurator, to transmit a first probe request message to the configurator, to receive a first probe response message including information necessary for connection to the enroller device from the configurator, to operate a timer and to transmit a second probe request message to the enroller device, to receive a second probe response message from the enroller device, and to start secure connection to the enroller device when the second probe request message is received before the timer expires and information included in the second probe response message matches the information necessary for the connection, which is included in the first probe response message; and a transceiver that transmits the first probe request message and the second probe request message and receives the first probe response message and the second probe response message under control of the controller.

The present disclosure proposes a method for supporting initial setup between an enrollee device and an enroller device, the method including: performing an association procedure between the enrollee device and the enroller device; receiving a probe request message including information indicating an initial setup configuration from the enrollee device; and transmitting a probe response message including information necessary for connection to the enroller device to the enrollee device.

The present disclosure proposes an apparatus for supporting initial setup between an enrollee device and an enroller device, the apparatus including: a controller that conducts control to perform an association procedure between the enrollee device and the enroller device, to receive a probe request message including information indicating an initial setup configuration operation from the enrollee device, and to transmit a probe response message including information necessary for connection to the enroller device when an input acknowledging the initial setup configuration operation is received; and a transceiver that receives the probe request message and transmits the probe response message under control of the controller.

The present disclosure proposes a method of a device for performing an initial setup procedure as supported by the configurator, and an apparatus using the same.

The present disclosure proposes a method of an AP for performing an initial setup procedure as supported by the configurator, and an apparatus using the same.

Advantageous Effects

The present disclosure provides a convenient Device Provisioning Protocol (DPP) setup procedure, which enables a setup procedure to be performed even in a device not providing a UI by using Touch Triggered Scan & Configuration (TTSC) triggered by only one touch on a configurator. According to the present disclosure, by using the configurator, a user may perform initial setup with the same (that is, unified) UX, not only where Wi-Fi is used as a communication mode for setup but also where Neighborhood-Area Networking (NAN as a type of low-power Wi-Fi technology) and Bluetooth Low Energy (BLE) are used.

In addition, the present disclosure uses a time restriction, such as a time window, for the security of a device participating in initial setup, thus achieving initial setup with very little signaling.

Also, the present disclosure may simplify an initial setup procedure for connection of a plurality of devices.

Further, the present disclosure enables setup to be achieved by a configurator, thus remarkably reducing time for connection between devices.

MODE FOR CARRYING OUT THE INVENTION

Figure 1:
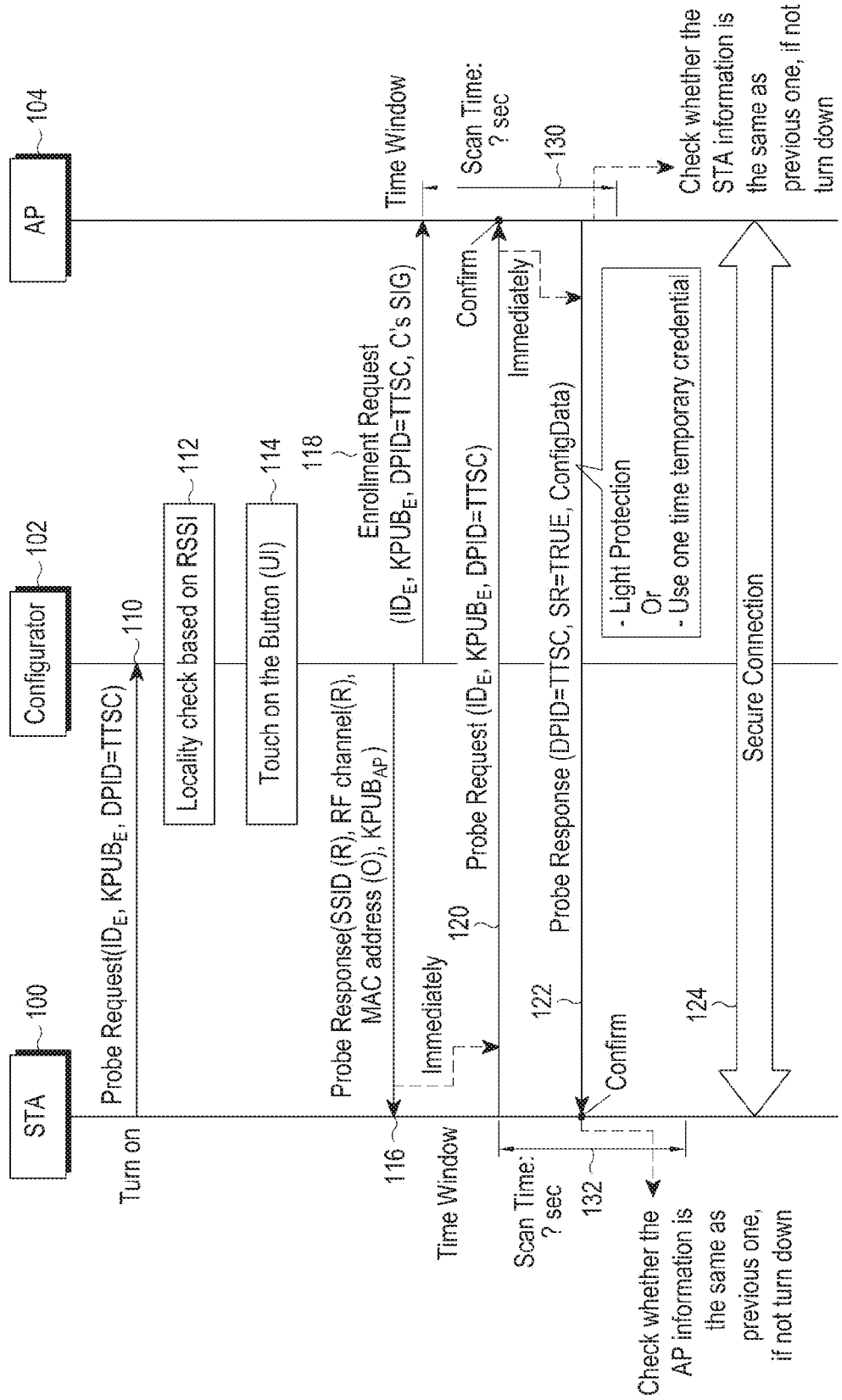
FIG. 1 illustrates a procedure in which a device and an AP perform initial setup using a configurator according to one embodiment of the present disclosure.

Hereinafter, embodiments of the present disclosure will be described in detail with reference to the accompanying drawings. In the following description of the present disclosure, a detailed description of known configurations or functions incorporated herein will be omitted when it is determined that the detailed description may make the subject matter of the present disclosure unclear. The terms as described below are defined in consideration of the functions in the embodiments, and the meaning of the terms may vary according to the intention of a user or operator, convention, or the like. Therefore, the definitions of the terms should be made based on the contents throughout the specification.

Before a detailed description of the present disclosure is made, examples of interpretable meanings of several terms used in the present disclosure will be suggested. However, it should be noted that the terms are not limited to the examples provided below.

An Access Point (AP) is an entity that communicates with a device, and may also be referred to as a base station, a BS, a NodeB (NB), an eNode B (eNB), or the like.

A device is an entity that communicates with an AP and may also be referred to as an object, a User Equipment (UE), a Mobile Station (MS), a station (STA), a Mobile Equipment (ME), a terminal, or the like.

A configurator is an entity that serves as a medium to connect a device and an AP. The configurator may be provided as a separate apparatus from the device or the AP, or may be provided as a module included in the device or the AP. For example, a terminal, such as a smartphone, may be provided as an apparatus serving as the configurator.

The present disclosure proposes a technique for supporting the initial setup of an AP and a device through only a single touch in a configurator using the configurator. The configurator transmits necessary information for two devices (that is, the device and the AP) that desire connection. Upon receiving the necessary information from the configurator, the device or the AP may check whether information received from the counterpart thereof (the AP or the device, respectively) within a predetermined period of time matches the information received from the configurator and may allow connection to the counterpart. Thus, by using the configurator, a unified UX for initial setup may be provided regardless of an initial setup communication mode (Wi-Fi or BLE) used by the device, and the usability of the device may be improved.

The present disclosure also proposes a method of using a time window of a limited time period in order to reduce the load of signaling for security in an initial setup process between an AP and a device. For example, when security is achieved based on close proximity using a Quick Response (QR) code or using Near Field Communication (NFC), a signaling load occurs due to the QR code or NFC communication. However, the present disclosure may check the reception of a response during a time window of a certain length from the start time of a setup procedure triggered by the configurator to check the validity of an enrollee, thus achieving security. That is, the method according to the present disclosure is intended to eliminate the load of signaling for security and to achieve security by using a time restriction. Thus, the setup method of the present disclosure may reduce the load of signaling. In addition, the method according to the present disclosure may use temporary credentials, thereby preventing hacking attacks by other devices.

Further, the present disclosure provides a convenient Device Provisioning Protocol (DPP) setup procedure, which enables a setup procedure to be performed even in a device not providing a UI (that is, a UI-less device) by using Touch Triggered Scan & Configuration (TTSC) of a configurator. According to the present disclosure, by using the configurator, a user may perform initial setup with the same (that is, unified) UX not only where a device uses Wi-Fi as a communication mode for setup but also where the device uses Neighborhood-Area Networking (NAN) or Bluetooth Low Energy (BLE).

In addition, the present disclosure uses a time restriction, such as a time window, for the security of a device participating in initial setup, thus achieving secure initial setup with very little signaling.

Figure 5:
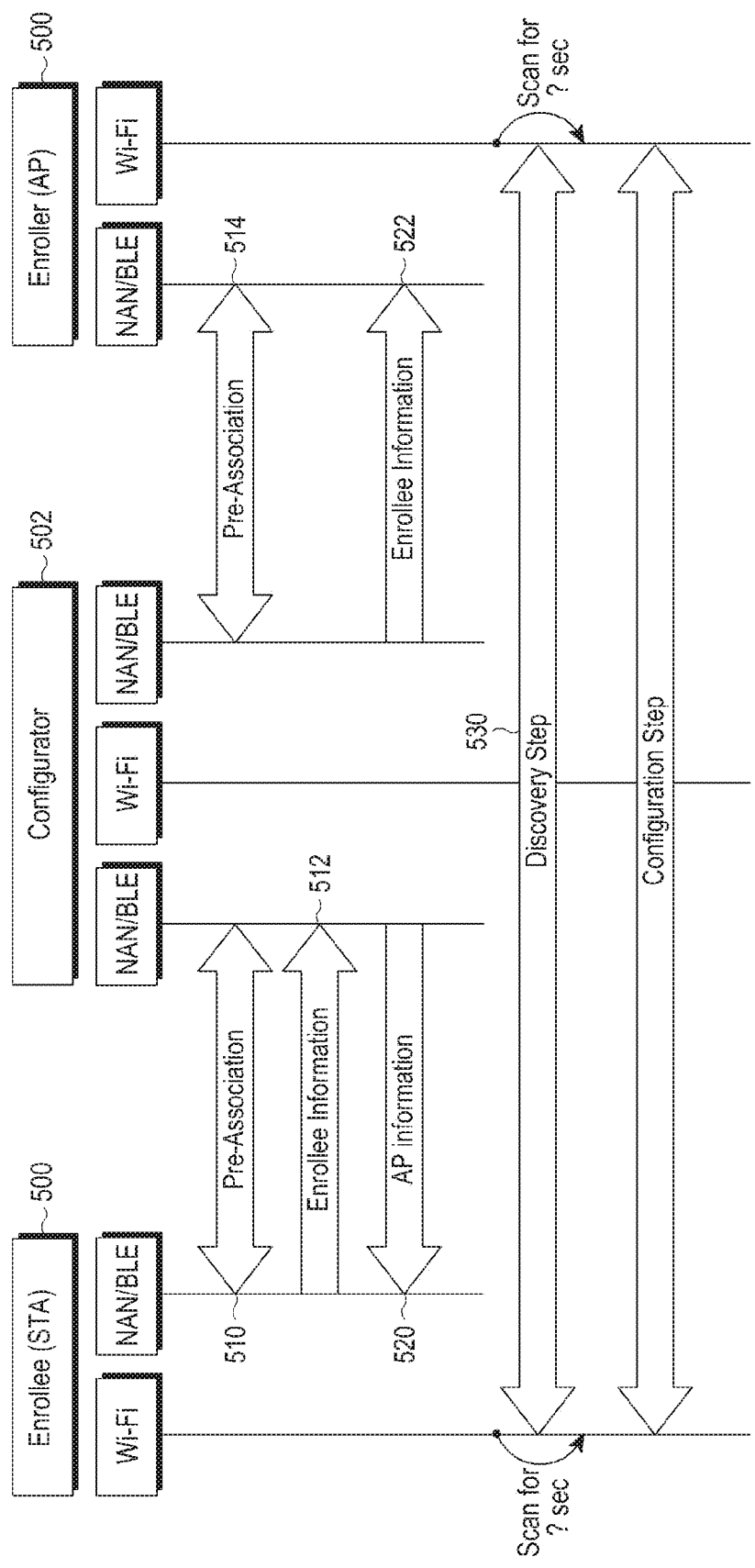
FIG. 5 illustrates a TTSC procedure using a configurator according to the present disclosure.

FIG. 5 illustrates a TTSC procedure using a configurator according to the present disclosure.

A configurator 502 may perform a pre-association procedure with a device 500 which is an enrollee (510). Here, the configurator 502 may receive information on the device 500 (512). Also, the configurator 502 may perform a pre-association procedure with an AP 504 which is an enroller (514). The configurator 502 may be, for example, user equipment such as a pad, a tablet, or a smartphone. The device 500, as the enrollee, may be any device capable of communicating with the AP, for example, a television (TV), a humidifier, or the like. The AP 504 as the enroller may be a small AP, for example, a wireless LAN router installed indoors.

When initial setup between the device and the AP is triggered by a user's input (for example, a touch), the configurator 502 transmits information on the AP 504 to the device 500 (520), and transmits the information on the device 500 to the AP 504 (522).

Upon receiving the information from the configurator 502, the device 500 and the AP 504 may immediately perform an initial setup procedure, and may perform a discovery procedure (530) for connection upon receiving a response within a certain period of time. For example, the device 500 may immediately transmit a message for initial setup, for example, a probe request message, to the AP 504, may receive a response message, for example, a probe response message, from the AP 504, and may verify whether information included in the response message matches the information 522 received from the configurator 502, thereby determining whether the initial setup procedure succeeded (or failed).

FIG. 1 illustrates a procedure in which a device and an AP perform initial setup using a configurator according to one embodiment of the present disclosure.

When the device 100 is powered on, the device 100 transmits a probe request message to the configurator 102 in order to start initial setup (110). The probe request message 110 may include $ID_E$ as an ID of enrollee information (for example, the device 100), $KPUB_E$ as a public key of the device 100, and a Device Password ID (DPID) as an ID indicating which type of connection the device 100 supports. The DPID may have a value indicating, for example, TTSC.

Optionally, the configurator 102 may check the locality of the device 100, that is, proximity, using the signal strength of the received probe request message, that is, a Received Signal Strength Indicator (RSSI).

Optionally, upon receiving the probe request message (that is, an initial setup request for connection) from the device 100, the configurator may notify a user through a UI that an enrollment request has been made. The configurator 102 may receive an acknowledgment (for example, a touch) of the request 110 (114).

When the acknowledgment (that is, the touch) is input from the user, the configurator 102 transmits a probe response message to the device 100 (116), and transmits an enrollment request message to the AP 104 (118). The probe response message 116 may include, as information necessary for the device 100 to connect to the AP 104, at least one of a Service Set ID (SSID), a Radio Frequency (RF) channel, $KPUB_{AP}$ as a public key of the AP 104, and a Media Access Control (MAC) address. The probe response message 116 may optionally include the MAC address, and may be required to include the SSID and RF channel. The enrollment request message 118 may include at least one of $ID_E$, $KPUB_E$, and the DPID. Further, the enrollment request message 118 may also include a C's SIG as a signature of the configurator 102, and the C's SIG may be used to ensure that the configurator is a device that the device 100 can trust.

Upon receiving the probe response message 116 from the configurator 102, the device 100 immediately transmits a probe request message 120 to the AP 104, and waits to receive a probe response message 122 from the AP 104 within a certain period of time (that is, a time window 132) by driving a timer. The time window 132 may be set to be short enough to ensure security, but long enough to receive the probe response message from the AP 104. That is, the time window 132 may be set to a time period that is short enough to prevent a different device other than the AP 104 from attempting to connect to (that is, hacking or attacking) the device through copied information. The probe request message 120 may include at least one of $ID_E$, $KPUB_E$, and the DPID.

Upon receiving the enrollment request message 118 from the configurator 102, the AP 104 immediately starts a timer and waits to receive the probe request message 120 from the device 100 within a certain period of time (that is, a time window 130). The time window 130 may be set to be short enough to ensure security, but long enough to receive the probe request message from the device 100. When the AP 104 receives the probe request message 120 in the time window 130, the AP 104 checks whether information on the device 100 included in the probe request message 120 matches information on the device 100 included in the enrollment request message 118. Through the foregoing check, the AP 104 may verify whether the device 100 is a valid enrollee. When the information on the device 100 included in the probe request message 120 matches the information on the device 100 included in the enrollment request message 118, the AP 104 may transmit the probe response message 122 to the device 100.

In addition, when the device 100 receives the probe response message 122 within the time window 132, the device 100 determines whether information on the AP included in the probe response message 122 matches information on the AP in the probe response message 116 received from the configurator 102. The probe response message 122 may include SetSelectedRegistrar (SR indicating the AP's confirmation) information with a value of 'TRUE' in addition to the DPID. In addition, the probe response message 122 may include ConfigData, which is configuration information on the AP 104. ConfigData includes, as the information on the AP 104, not only the SSID, the RF channel, the MAC address, and the public key $KPUB_{AP}$ but also temporary credentials or a light encryption (security) key as one-time credentials for connection. The AP 104 sends the temporary credentials to the device 100, instead of permanent credentials, because a secure connection has not yet been established between the AP 104 and the device 100. That is, the temporary credentials are used to prevent hacking due to leakage of permanent credentials. Since security is achieved through the use of a time window, only light encryption (security) need be applied as the temporary credentials.

When the device 100 receives the probe response 122 in the predefined time window 132 and checks that the probe response 122 matches the previous probe response 116, the device 100 starts secure connection with the AP 104 (124). A procedure for the secure connection 124 procedure may be implemented according to any existing mode.

Optionally, when there are two or more messages received within each time window (132 and 130), the device 100 and the AP 104 may determine that an attempt to connect is being made by a device that attempts hacking, and may terminate the setup procedure. The device 100 and the AP 104 may start a new initial setup procedure. In addition, when termination of a setup procedure is repeated a predetermined number of times or more due to the reception of two or more messages within the time window, the device 100 and the AP 104 may transmit a warning message to the configurator 102.

Figure 2:
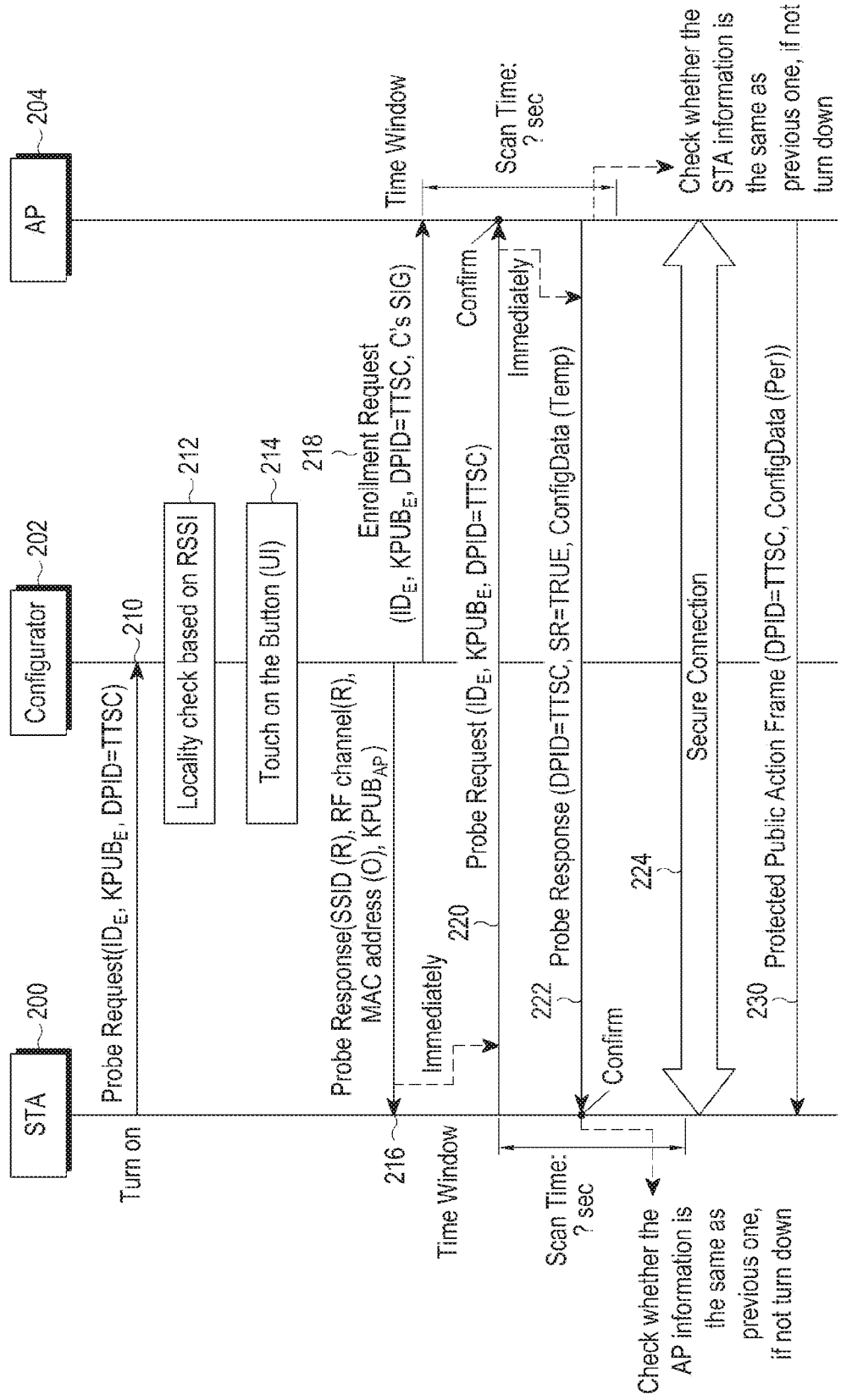
FIG. 2 illustrates a procedure in which a device and an AP perform initial setup using a configurator according to one embodiment of the present disclosure.

FIG. 2 illustrates a procedure in which a device and an AP perform initial setup using a configurator according to one embodiment of the present disclosure.

In FIG. 2, the device 200, the configurator 202, and the AP 204 perform an initial setup procedure. Operations 210 to 224 illustrated in FIG. 2 are the same as operations 110 to 124 of FIG. 1, and thus a detailed description thereof will be omitted.

When the device 200 and the AP 204 establish a secure connection 224, the AP 204 may optionally transmit a protected public action frame to the device 200, thereby forwarding permanent credentials rather than one-time temporary credentials (230). The permanent credentials may be transmitted via ConfigData in the protected public action frame.

Figure 3:
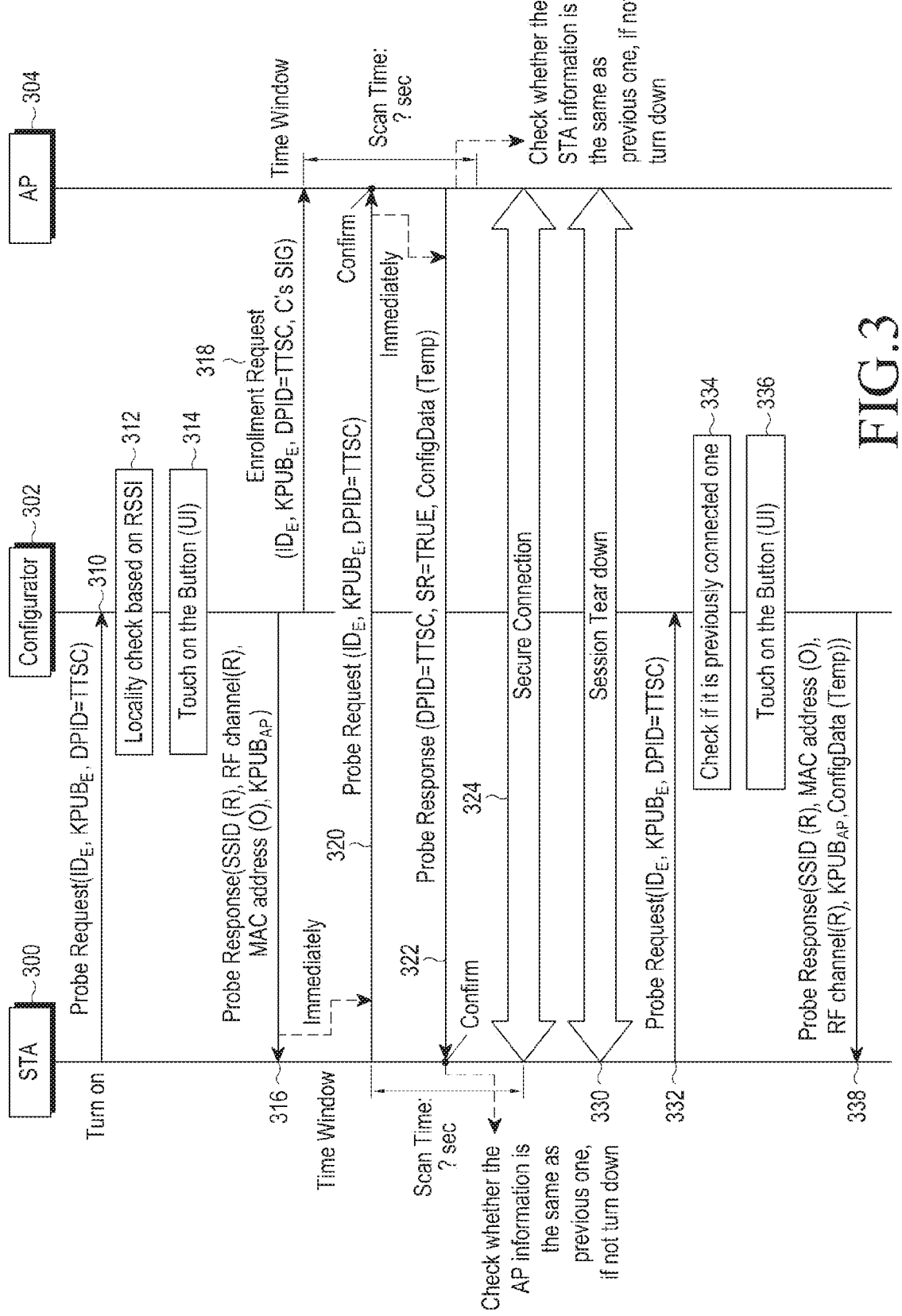
FIG. 3 illustrates a procedure in which a device and an AP perform initial setup using a configurator according to one embodiment of the present disclosure.

FIG. 3 illustrates a procedure in which a device and an AP perform initial setup using a configurator according to one embodiment of the present disclosure.

In FIG. 3, the device 300, the configurator 302, and the AP 304 perform an initial setup procedure. Operations 310 to 324 illustrated in FIG. 3 are the same as operations 110 to 124 of FIG. 1, and thus a detailed description thereof will be omitted.

After establishing secure connection 324 and performing communication, the device 300 and the AP 304 may terminate a session (330). Once the device 300 establishes secure connection by receiving temporary credentials from the AP 304 and then terminates a session, the device 300 becomes incapable of re-establishing a secure connection with the AP 304 using the temporary credentials. Thus, the device 300 transmits a probe request message for connection establishment to the configurator 302 once again (332).

Upon receiving the probe request message 332, the configurator 302 may determine whether the device 300 has previously succeeded in initial setup for connection using information (for example, at least one of $ID_E$, $KPUB_E$, and a DPID) included in the probe request message 332 (334).

When the device 300 has previously succeeded in initial setup and an input (that is, a touch) to trigger TTSC is made (336), the configurator 302 (instead of the AP 304) may directly create temporary credentials for connection to the AP 304 and may forward the temporary credentials to the device 300. Specifically, the configurator 302 may transmit a probe response message 338 to the device 300. The probe response message 338 may include ConfigData including temporary credentials of the AP 304 and may further include at least one of an SSID, a MAC address, an RF channel, and a $KPUB_{AP}$ of the AP 304.

Figure 4:
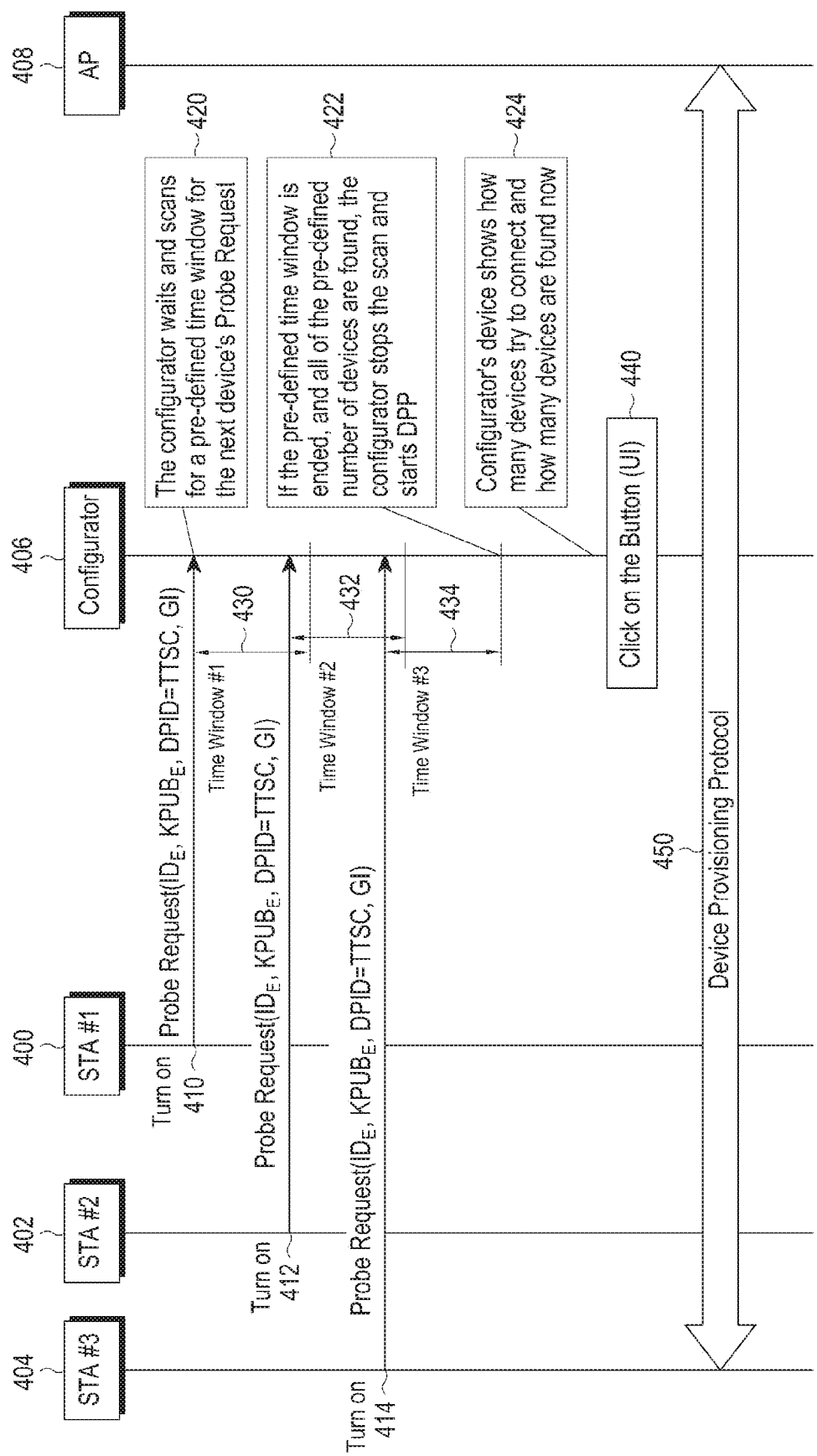
FIG. 4 illustrates a procedure in which a plurality of devices and an AP perform initial setup using a configurator according to one embodiment of the present disclosure.

FIG. 4 illustrates a procedure in which a plurality of devices and an AP perform initial setup using a configurator according to one embodiment of the present disclosure.

For example, if a plurality of devices, for example, a plurality of sensors, requests connection to a network, a procedure of approving all enrollment requests from the plurality of devices through a configurator is a very complicated task (for example, when there are ten sensors, the same operation is repeated 10 times). Accordingly, the present disclosure provides a method for simplifying a triggering operation of the configurator even when a plurality of devices makes an enrollment request.

When the plurality of devices is managed as one group, the configurator may efficiently manage TTSC. For example, the plurality of devices may have a single Group ID (GI). For example, a GI may be included in a Device Provisioning Protocol (DPP) Information Element (IE) defined in the Wi-Fi Alliance standard.

When a probe request message 410 is received from device 1 400, the configurator 406 may operate a timer, and may wait and scan for a probe request received from another device during a predefined time window 430 (420). The probe request message 410 may further include a GI in addition to at least one of $ID_E$, $KPUB_E$, and a DPID. When the GI is included in the probe request message 410, the configurator 406 may determine that there is an enrollment request from another device belonging to a group and may decide to wait to receive a new probe request. That is, the GI indicates that the device 400 belongs to the group.

When a probe request message 412 is received from device 2 402 within the time window 430, the configurator 406 may operate the timer again, and may wait and scan for a probe request received from another device during a predefined time window 432. The probe request message 412 may further include a GI in addition to at least one of $ID_E$, $KPUB_E$, and a DPID.

When a probe request message 414 is received from device 3 404 in the time window 432, the configurator 406 may (immediately) operate the timer again, and may wait and scan for a probe request received from another device during a predefined time window 434. The probe request message 414 may further include a GI in addition to at least one of $ID_E$, $KPUB_E$, and a DPID.

When no new probe request message is received until the end of the time window 434 or when all probe request messages corresponding to the number of devices belonging to the group are received, the configurator 406 may terminate the scan operation and may start an initial setup procedure (that is, DPP) (422).

Optionally, the configurator 406 may wait for user input while displaying on a screen how many devices have requested connection or how many devices have been scanned (424). For example, the configurator 406 may display the ratio of the number of devices of which enrollment requests have been received to the total number of devices belonging to the group. Here, the total number of devices may be set in advance and may be shared with the configurator.

When the configurator 406 receives an input (for example, a touch) (440), the configurator may perform subsequent procedures (that is, DPP) (450) of initial setup, illustrated in FIGS. 1 to 3.

Table 1 sets forth attributes of an IE that may be additionally included for a device group according to one embodiment of the present disclosure.

TABLE 1

| Attribute | Required/Optional/C | Value |
|---|---|---|
| ERT (Enrollee Request Type) | ○ | Single request (0x01), one of multiple requests (0x02) |
| TWE (Time Window for Enrollee) | ○ | The length of a time window for waiting to receive the next enrollee request when receiving an enrollee request |
| EGI (Enrollee Group Indicator) | ○ | Displays the number of devices in a group |

Figure 6:
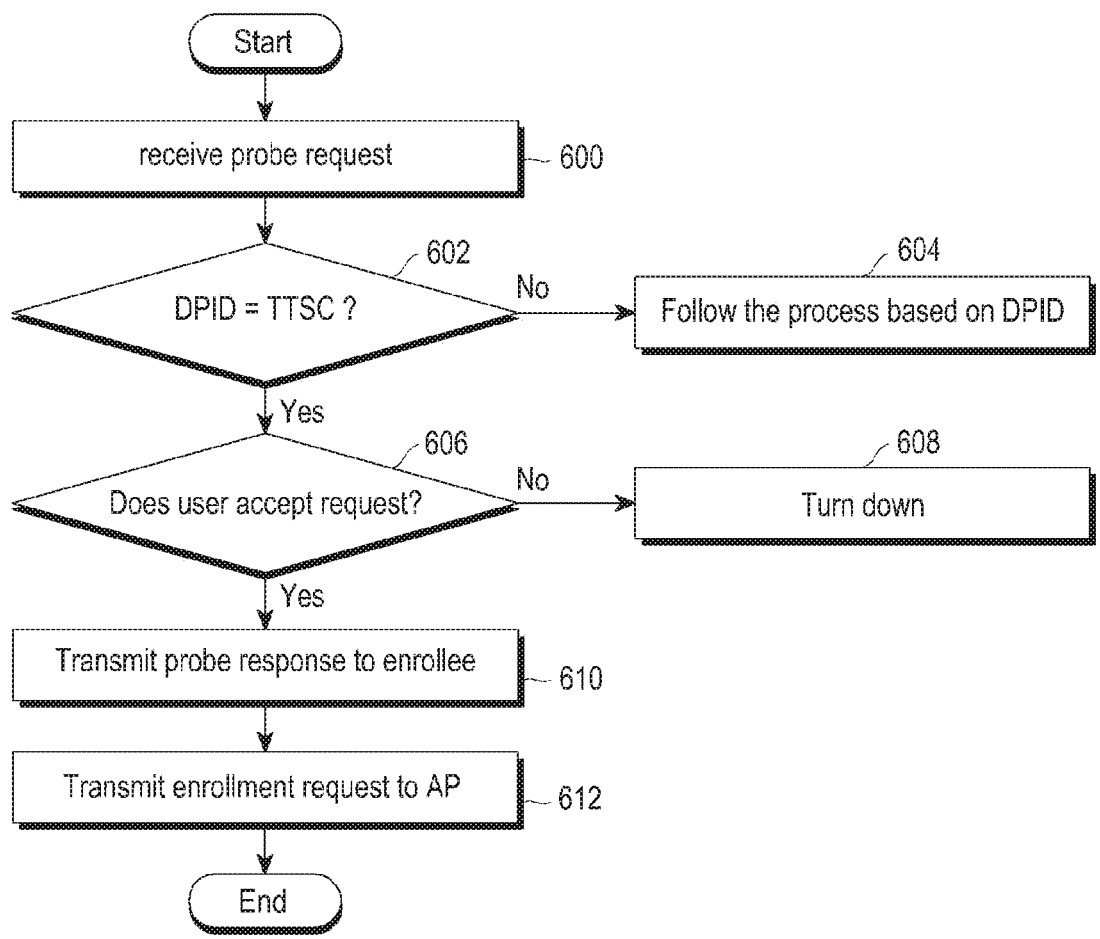
FIG. 6 illustrates an operation of a configurator according to an embodiment of the present disclosure.

FIG. 6 illustrates an operation of a configurator according to embodiments of the present disclosure.

The configurator receives a probe request message from an enrollee (that is, a device) (600).

The configurator checks whether a DPID included in the probe request message indicates TTSC (602).

When the DPID does not indicate TTSC, the configurator performs an initial setup procedure according to a connection mode indicated by the DPID (604).

When the DPID indicates TTSC, the configurator checks whether there is an acknowledgement of TTSC, that is, an acknowledgment input, from a user (606).

When there is no acknowledgment input from the user, the configurator operates no longer, and terminates the procedure (608). Alternatively, the configurator may turn off the device.

When there is an acknowledgment input from the user, the configurator transmits a probe response message to the device (610). Further, the configurator transmits an enrollment request message to an enroller (that is, an AP) (612).

Figure 7:
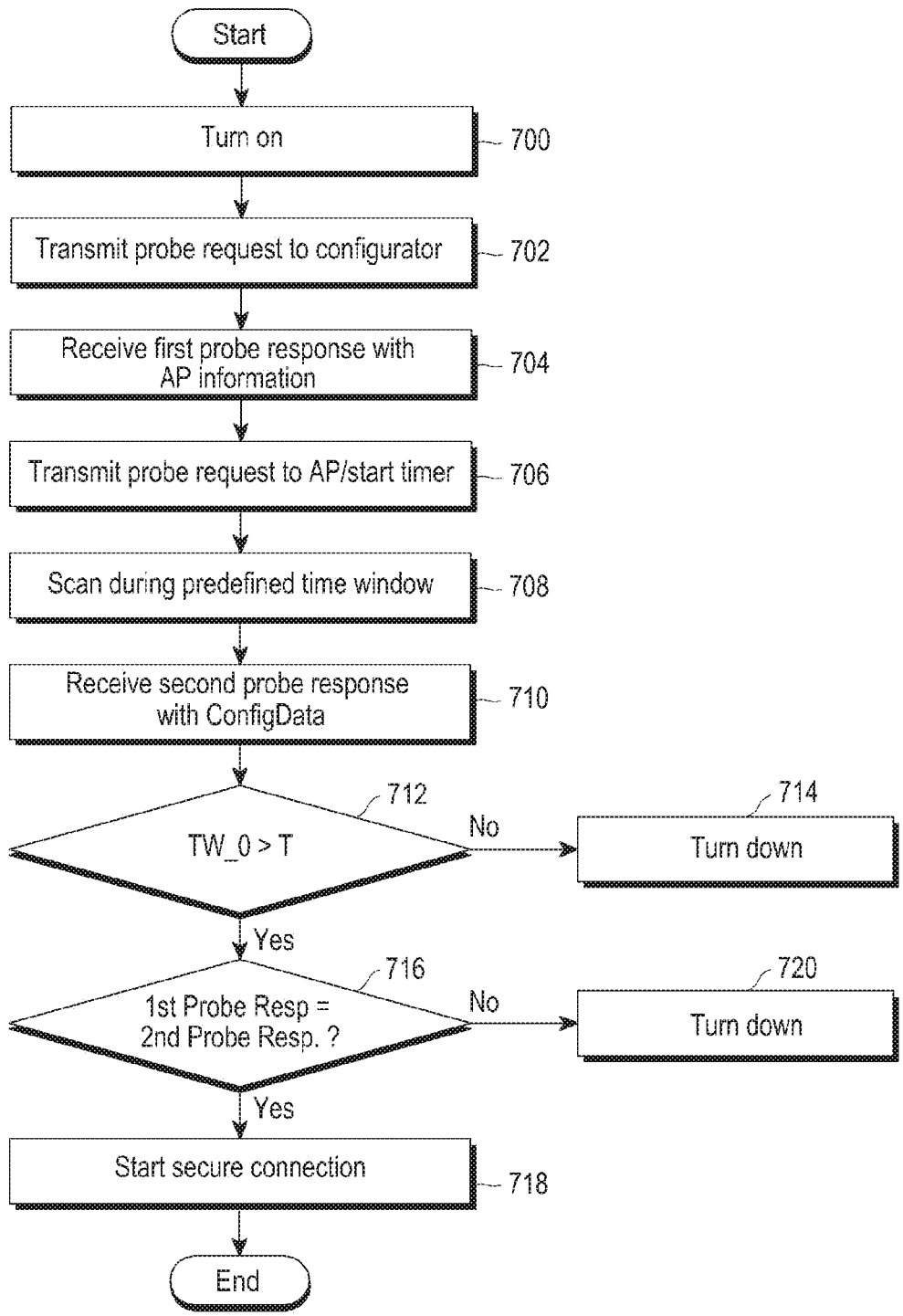
FIG. 7 illustrates an operation of a device that requests connection according to an embodiment of the present disclosure.

FIG. 7 illustrates an operation of a device that requests connection according to an embodiment of the present disclosure.

When an enrollee (that is, the device) is turned on (700), the device transmits a first probe request message to a configurator (702).

The device receives a first probe response message from the configurator (704). The first probe response message may include pieces of information necessary for connection to an enroller (that is, an AP).

The device transmits a second probe request message to the AP, starts a timer (706), and waits to receive a second probe response message during a predefined time window (708).

When the device receives a second probe response message including ConfigData on the AP (710), the device determines whether a current time (T) is within the time window (TW_0) (712).

When the current time exceeds the time window (that is, when no second probe response message is received within the time window), the device may disregard the second probe request message, and may terminate an initial setup procedure (714). Alternatively, the device may be turned off.

When the current time is within the time window (that is, when the second probe response message 710 is received within the time window), the device may check whether AP information included in the second probe response message 710 matches AP information included in the first probe response message 704 (716).

As a result of checking in 716, when the above pieces of information do not match each other, the device may disregard the second probe response message and may terminate the initial setup procedure (720). Alternatively, the device may be turned off.

As a result of checking in 716, when the above pieces of information are found to match each other, the device starts a procedure for establishing a secure connection to the AP using the AP information included in the second probe response message 710 (718).

Figure 8:
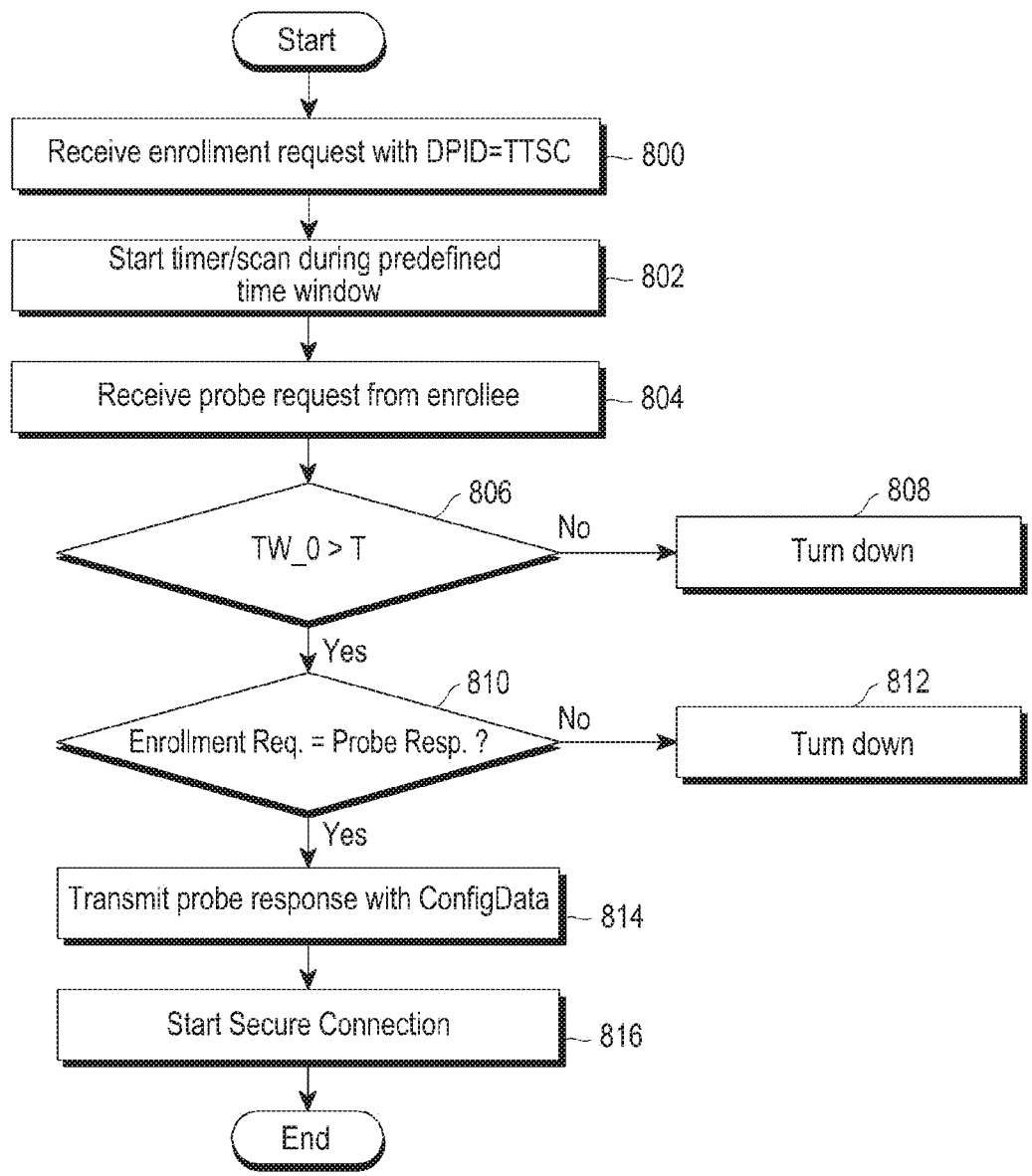
FIG. 8 illustrates an operation of an AP that accepts connection according to an embodiment of the present disclosure.

FIG. 8 illustrates an operation of an AP that accepts connection according to an embodiment of the present disclosure.

An enroller (that is, the AP) receives an enrollment request message including a DPID that indicates TTSC (800).

The AP immediately starts a timer and waits to receive a probe request message during a predefined time window (802).

When the AP receives a probe request message from an enrollee (for example, a device) (804), the AP determines whether a current time (T) is within the time window (TW_0) (806).

When the current time exceeds the time window (that is, when no probe request message is received within the time window), the AP may disregard the probe request message 804 and may terminate an initial setup procedure (808).

When the current time is within the time window (that is, when the probe request message is received within the time window), the AP may check whether device information included in the probe request message 804 matches device information included in the enrollment request message 800 (810).

As a result of checking in 810, when the above pieces of information are found not to match each other, the AP may disregard the probe request message 804 and may terminate the initial setup procedure (812).

As a result of checking in 810, when the above pieces of information are found to match each other, the AP transmits a probe response message including ConfigData on the AP to the device (814).

The AP starts a procedure for secure connection with the device (816).

Figure 9:
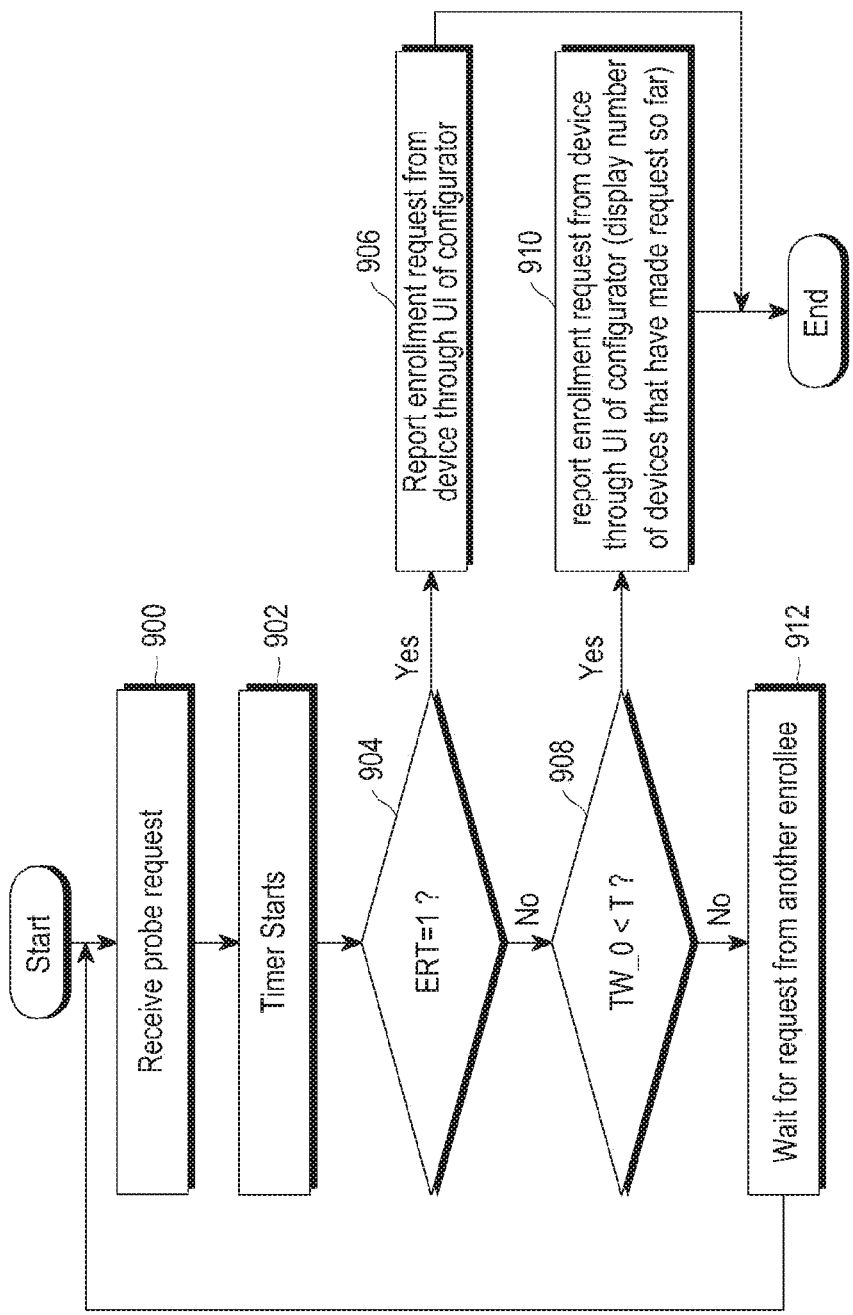
FIG. 9 illustrates an operation of a configurator according to one embodiment of the present disclosure.

FIG. 9 illustrates an operation of a configurator according to one embodiment of the present disclosure.

The configurator receives a probe request message (900).

The configurator starts a timer (902).

The configurator checks whether an Enrollee Request Type (ERT) value included in the probe request message is 1 (904).

When the ERT value is 1, the configurator determines that an enrollment request is made by a single device, rather than by a group, and displays the enrollment request from the device through a UI on a screen (906).

When the ERT value is not 1, the configurator determines that an enrollment request is made by a device in a group and checks whether a predefined time window has elapsed (908).

When the time window has not expired, the configurator may wait to receive a probe request message from another enrollee by repeating operations 900 to 910 (912). Optionally, when the time window has not expired, the configurator may notify a user of an enrollment request, displaying the number of devices that have made enrollment requests so far through a UI on the screen (910).

Figure 10:
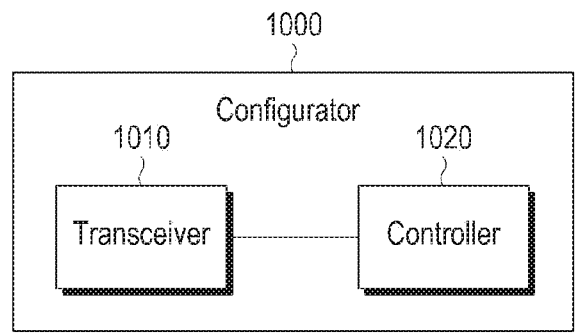
FIG. 10 schematically illustrates the configuration of a configurator according to an embodiment of the present disclosure.

FIG. 10 schematically illustrates the configuration of a configurator according to embodiments of the present disclosure.

The configurator 1000 may include a transceiver 1010 to perform signal transmission and reception with a device or an AP and a controller 1020 to control the overall operation of the configurator 1000. It can readily be understood that all operations of the configurator described above in the embodiments of the present disclosure are performed under the control of the controller 1020. The controller 1020 and the transceiver 1010 are not necessarily configured as separate devices, but may be configured as a single component, such as a single chip.

Figure 11:
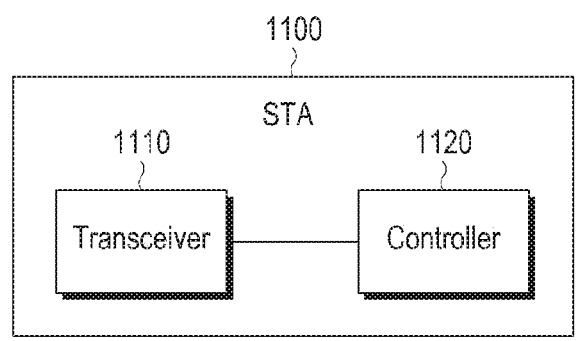
FIG. 11 schematically illustrates the configuration of a device according to an embodiment of the present disclosure.

FIG. 11 schematically illustrates the configuration of a device according to embodiments of the present disclosure.

The device 1100 may include a transceiver 1110, to perform signal transmission and reception with a configurator or an AP, and a controller 1120, to control the overall operation of the device 1100. It can readily be understood that all operations of the device described above in the embodiments of the present disclosure are performed under the control of the controller 1120. The controller 1120 and the transceiver 1110 are not necessarily configured as separate devices but may be configured as a single component, such as a single chip.

Figure 12:
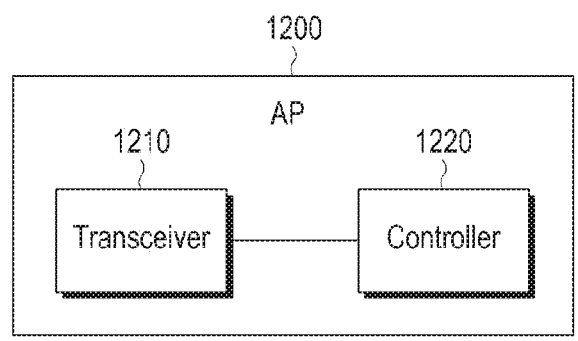
FIG. 12 schematically illustrates the configuration of an AP according to an embodiment of the present disclosure.

FIG. 12 schematically illustrates the configuration of an AP according to embodiments of the present disclosure.

The AP 1200 may include a transceiver 1210, to perform signal transmission and reception with a device or a configurator, and a controller 1220, to control the overall operation of the AP 1200. It can readily be understood that all operations of the AP described above in the embodiments of the present disclosure are performed under the control of the controller 1220. The controller 1220 and the transceiver 1210 are not necessarily configured as separate devices, but may be configured as a single component, such as a single chip.

The system signal flows, the initial setup procedures, the DPP procedures, and the methods of various devices as shown in FIGS. 1 to 12 are not intended to limit the scope of the present disclosure. That is, all components or operations shown in FIGS. 1 to 12 should not be interpreted as essential components for embodying the present disclosure, and the present disclosure can be embodied using only some of the components without departing from the technical features of the present disclosure.

The above-described operations can be realized by including a memory device storing a corresponding program code in an AP, a configurator, or an arbitrary component of a device in a communication system. That is, the AP, the configurator, or the controller of the device can execute the above-described operations by reading and executing the program code stored in the memory device through a processor or a Central Processing Unit (CPU).

Various structural elements of the AP, the configurator or the device, modules, and the like, as described herein, may be operated by using a hardware circuit, e.g, a complementary metal oxide semiconductor based logic circuit, firmware, software, and/or a combination of hardware and the firmware and/or software embedded in a machine readable medium. As an example, various electric configurations and methods may be carried out by using electric circuits such as transistors, logic gates, and an Application Specific Integrated Circuit (ASIC).

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The invention claimed is:

1. A method for performing an initial setup with an enroller device by an enrollee device, the method comprising:
   transmitting a first probe request message to a configurator;
   receiving a first probe response message comprising information fora connection with the enroller device from the configurator;
   operating a timer and transmitting a second probe request message to the enroller device;
   receiving a second probe response message from the enroller device; and
   starting a secure connection to the enroller device when the second probe response message is received before the timer expires and information comprised in the second probe response message matches the information for the connection, which is comprised in the first probe response message.

2. The method of claim 1, wherein the first probe request message comprises information indicating an initial setup configuration through the configurator.

3. The method of claim 1, wherein the second probe response message comprises at least one of information indicating a confirmation of the enroller device and a temporary credential.

4. The method of claim 1, comprising terminating the initial setup with the enroller device when the second probe response message is not received before the timer expires or the information comprised in the second probe response message does not match the information for the connection, which is comprised in the first probe response message.

5. An enrollee device that performs an initial setup with an enroller device, the device comprising:
   a transceiver; and
   at least one processor configured to be connected to the transceiver,
   wherein the at least one processor is configured to:
   transmit a first probe request message to a configurator,
   receive a first probe response message comprising information for a connection with the enroller device from the configurator,
   operate a timer and to transmit a second probe request message to the enroller device,
   receive a second probe response message from the enroller device, and
   start a secure connection to the enroller device when the second probe response message is received before the timer expires and information comprised in the second probe response message matches the information for the connection, which is comprised in the first probe response message.

6. The device of claim 5, wherein the first probe request message comprises information indicating an initial setup configuration through the configurator.

7. The device of claim 5, wherein the second probe response message comprises at least one of information indicating a confirmation of the enroller device and a temporary credential.

8. The device of claim 5, wherein the controller conducts control to terminate the initial setup with the enroller device when the second probe response message is not received before the timer expires or the information comprised in the second probe response message does not match the information for the connection, which is comprised in the first probe response message.

9. A method for supporting an initial setup between an enrollee device and an enroller device using a configurator, the method comprising:
    receiving a probe request message comprising information indicating a request for the initial setup from the enrollee device;
    identifying that a type of triggering provided by the configurator based on the information included the probe request;
    in case that the type of triggering is identified as triggering the initial setup with a touch input, obtaining an touch input data; and
    transmitting a probe response message comprising information for a connection with the enroller device to the enrollee device based on the touch input data; and
    transmitting an enrollment request message comprising information on the enrollee device to the enroller device based on the touch input data.

10. An apparatus for supporting an initial setup between an enrollee device and an enroller device, the apparatus comprising:
    a transceiver; and
    at least one processor configured to be connected to the transceiver,
    wherein the at least one processor is configured to:
    receive a probe request message comprising information indicating a request for the initial setup from the enrollee device,
    identify that a type of triggering provided by the apparatus based on the information-is included the probe request,
    in case that the type of triggering is identified as triggering the initial setup with a touch input, obtain an touch input data,
    transmit a probe response message comprising information for a connection with the enroller device to the enrollee device based on the touch input data, and
    transmit an enrollment request message comprising information on the enrollee device to the enroller device based on the touch input data.

* * * * *